United States Patent Office.

ALBION R. CLAPP, OF BOSTON, MASSACHUSETTS, ASSIGNOR TO JAMES R. NICHOLS & CO., OF SAME PLACE.

Letters Patent No. 114,264, dated May 2, 1871.

IMPROVEMENT IN CITRATES OF IRON AND MANGANESE FOR MEDICAL PURPOSES.

The Schedule referred to in these Letters Patent and making part of the same.

Be it known that I, ALBION R. CLAPP, of Boston, in the county of Suffolk and State of Massachusetts, have discovered a method of combining iron and manganese in soluble form in scales, or a citrate of iron and manganese, of which the following is a full, clear, and exact description, which will enable any one skilled in the art to compound and manufacture the same.

The citrate of sesquioxide of iron in the form of garnet-colored scales, dried upon glass from the solution, has long been known and used in medicine as a chalybeate and tonic. It has been found of much use in anæmia or in cases of impoverished blood; but it has been observed that in some forms of disease resembling anæmia it failed to exert a beneficial influence. The reason of the failure to produce expected results was unknown until by chemical analysis it was discovered that iron was not the only metal held in the blood, but that the element manganese subserved in the circulation nearly as important ends as iron. It was found that in certain forms of blood impoverishment was due to the absence of manganese, and hence it was further ascertained that the administering of manganese in soluble form produced curative effects when iron failed.

In order to present the two elements in association in an elegant and soluble form for therapeutic use, I have combined them together in the form of a citrate of iron and manganese. This is a new preparation or combination, which, upon extended practical trial by physicians, has been found to be a remedial agent of great service to invalids.

The method of preparation is as follows:

The ordinary citrate of manganese is prepared from the freshly precipitated carbonate, using for the same three pounds of the sulphate of manganese, and to this is added ammonia until it is fully disolved, or until the solution becomes clear. To this clear solution are added ten (10) pounds of dry ammoniated citrate of the sesquioxide of iron, and, without evaporation, it is quickly spread upon plates of glass or porcelain to dry. In a few hours it becomes dry and the clear scales or small plates are removed and the process is completed.

What I claim as new, and desire to secure by Letters Patent, is—

The substance formed by the combination of the citrates of the oxides of iron and manganese, essentially as herein set forth.

In testimony whereof I have signed my name to this specification in the presence of two subscribing witnesses.

ALBION R. CLAPP.

Witnesses:
H. D. BILLINGS,
C. F. TUKEY.